US006974252B2

(12) United States Patent
Bowden et al.

(10) Patent No.: US 6,974,252 B2
(45) Date of Patent: Dec. 13, 2005

(54) FAILSAFE MECHANISM FOR PREVENTING AN INTEGRATED CIRCUIT FROM OVERHEATING

(75) Inventors: Scott J. Bowden, Hillsboro, OR (US); Jonathan P. Douglas, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/387,152

(22) Filed: Mar. 11, 2003

(65) Prior Publication Data

US 2004/0179576 A1    Sep. 16, 2004

(51) Int. Cl.[7] .................... G01K 7/42; G01K 3/04; H03K 3/01
(52) U.S. Cl. .................... 374/163; 327/513; 702/130
(58) Field of Search .................. 374/163, 169, 374/141; 702/99, 130, 132, 133, 33–35, 40, 702/117; 327/512, 513; 716/4

(56) References Cited

U.S. PATENT DOCUMENTS

| | | | | |
|---|---|---|---|---|
| 4,980,586 A | * | 12/1990 | Sullivan et al. | 327/262 |
| 5,287,292 A | * | 2/1994 | Kenny et al. | 702/132 |
| 5,303,390 A | * | 4/1994 | Little | 714/1 |
| 5,355,123 A | * | 10/1994 | Nishiura et al. | 340/653 |
| 5,590,061 A | * | 12/1996 | Hollowell, et al. | 702/130 |
| 5,623,594 A | * | 4/1997 | Swamy | 714/1 |
| 5,686,858 A | * | 11/1997 | Malherbe | 327/512 |
| 5,731,735 A | * | 3/1998 | Yokota et al. | 327/535 |
| 5,805,403 A | * | 9/1998 | Chemla | 361/103 |
| 5,818,277 A | * | 10/1998 | Miura | 327/262 |
| 5,835,553 A | * | 11/1998 | Suzuki | 377/25 |
| 5,838,578 A | | 11/1998 | Pippin | |
| 5,886,564 A | * | 3/1999 | Sato et al. | 327/513 |
| 6,006,168 A | * | 12/1999 | Schumann et al. | 702/132 |
| 6,169,442 B1 | * | 1/2001 | Meehan et al. | 327/513 |
| 6,321,175 B1 | * | 11/2001 | Nagaraj | 702/132 |
| 6,393,374 B1 | * | 5/2002 | Rankin et al. | 702/132 |
| 6,396,321 B1 | * | 5/2002 | Watanabe et al. | 327/158 |
| 6,400,741 B1 | * | 6/2002 | Matsunaga et al. | 372/38.02 |
| 6,590,439 B1 | * | 7/2003 | Larson | 327/363 |
| 6,630,754 B1 | * | 10/2003 | Pippin | 307/117 |
| 6,631,503 B2 | * | 10/2003 | Hsu et al. | 716/4 |
| 6,701,273 B2 | * | 3/2004 | Nishigaki et al. | 702/132 |
| 6,775,637 B2 | * | 8/2004 | Garcia | 702/117 |
| 6,789,037 B2 | * | 9/2004 | Gunther et al. | 702/132 |
| 6,809,568 B2 | * | 10/2004 | Kamel et al. | 327/170 |
| 6,850,856 B1 | * | 2/2005 | Gauthier et al. | 702/99 |
| 2002/0075163 A1 | * | 6/2002 | Smith et al. | 340/870.16 |
| 2003/0038648 A1 | * | 2/2003 | Gold et al. | 324/760 |
| 2003/0042885 A1 | * | 3/2003 | Zhou et al. | 324/105 |
| 2003/0158697 A1 | * | 8/2003 | Gold et al. | 702/132 |
| 2004/0037346 A1 | * | 2/2004 | Rusu et al. | 374/121 |
| 2004/0070910 A1 | * | 4/2004 | Gergintschew | 361/103 |
| 2004/0103330 A1 | * | 5/2004 | Bonnett | 713/322 |
| 2004/0105487 A1 | * | 6/2004 | Chen | 374/163 |
| 2004/0164781 A1 | * | 8/2004 | Doyle | 327/291 |
| 2004/0196090 A1 | * | 10/2004 | Sutherland | 327/513 |

* cited by examiner

*Primary Examiner*—Gail Verbitsky
(74) *Attorney, Agent, or Firm*—Blakely, Sokoloff, Taylor & Zafman LLP

(57) ABSTRACT

Techniques for preventing an integrated circuit (IC) from overheating are described herein. According to one embodiment, an exemplary process includes detecting whether a temperature of an integrated circuit (IC) exceeds a threshold independent of an operating state of the IC, and removing at least a portion of a power from the IC if the temperature of the IC exceeds the threshold. Other methods and apparatuses are also described.

13 Claims, 10 Drawing Sheets

FAILSAFE MECHANISM FOR PREVENTING AN INTEGRATED CIRCUIT FROM OVERHEATING

FIELD

Embodiments of the invention relate to the field of an integrated circuit; and more specifically, to a thermal protection mechanism for an integrated circuit.

BACKGROUND

As integrated circuit (IC) dice become more densely packed with circuit components and operating frequencies increase, power consumption of these ICs increases. Increased power consumption results in increased operating temperature, which if not controlled can cause catastrophic failure of the IC.

Prior thermal solutions include heat sinks, liquid cooling, fans, etc. Conventional power management includes reduced operating frequency, and shutting down of a clock signal for a period of time, etc. Combination of thermal solutions and power management often allows an IC to operate within an acceptable thermal range.

Some conventional methods use a thermal sensor to detect whether a temperature of an IC exceeds a temperature threshold. A typical conventional approach is to use a chip reset to disable the thermal sensor. That is, when the chip is in reset, the thermal sensor output is disabled. However, chip reset often is a high power state. As a result, an extended amount of time in reset may cause overheating. Therefore, if the thermal sensor is disabled during reset, this overheating may rapidly become destructive, leading to destruction of the chip and possibly the motherboard and even becoming a fire hazard.

BRIEF DESCRIPTION OF THE DRAWINGS

The invention may best be understood by referring to the following description and accompanying drawings that are used to illustrate embodiments of the invention. In the drawings.

DETAILED DESCRIPTION

Techniques for preventing an integrated circuit (IC) from overheating are described. In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
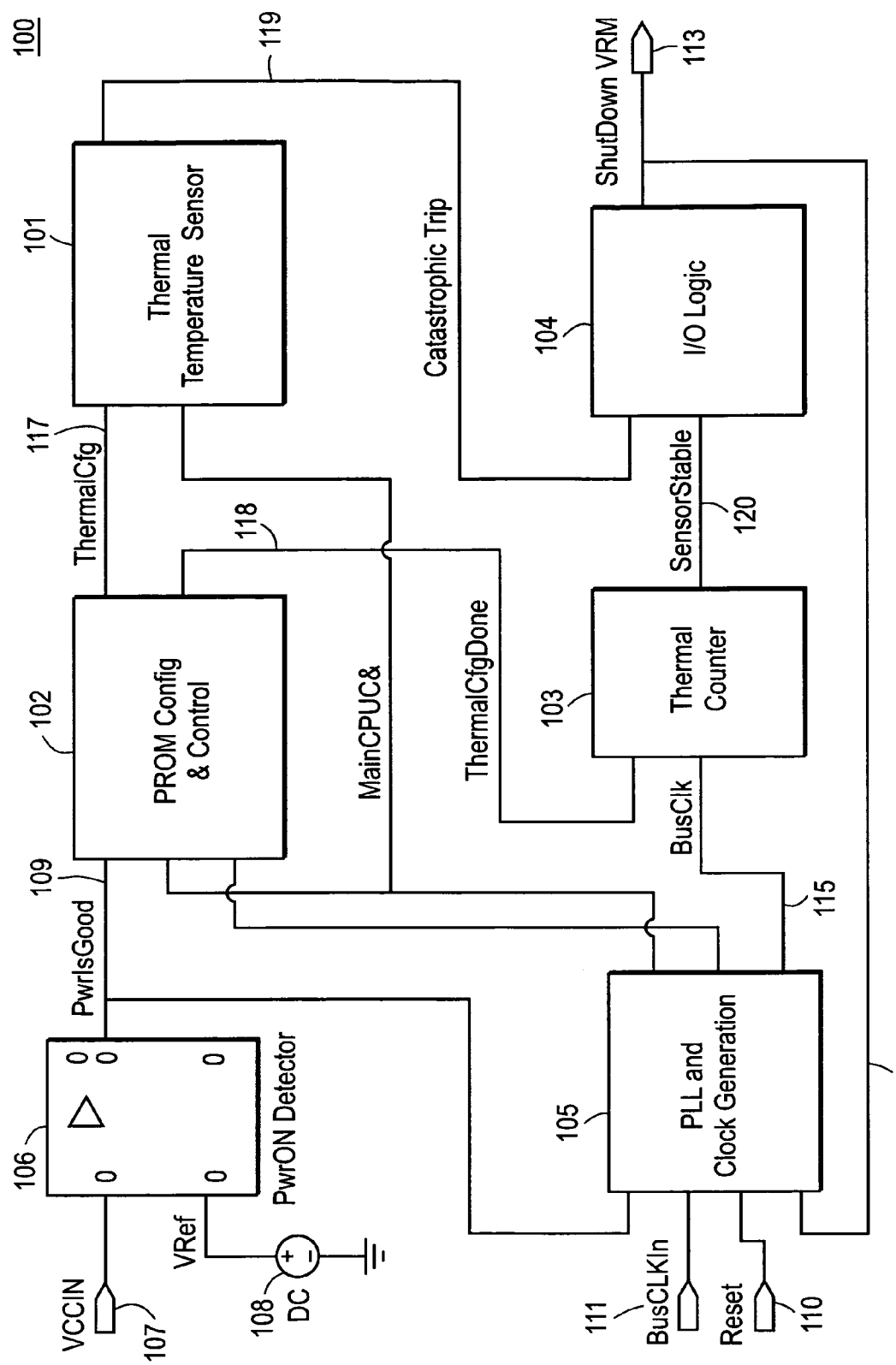
FIG. 1 is a block diagram of an exemplary embodiment of a thermal protection mechanism.

FIG. 1 shows a block diagram of an exemplary embodiment of a thermal protection circuit for preventing an IC from overheating. In one embodiment, exemplary circuit 100 includes a thermal sensor to detect whether a temperature of an integrated circuit (IC) exceeds a predetermined threshold regardless of a state of the IC, and an IO (input and output) logic coupled to the thermal sensor to transmit a signal to remove at least a portion of a power from the IC, if the temperature of the IC exceeds a predetermined threshold.

Referring to FIG. 1, according to one embodiment, circuit 100 includes a thermal sensor 101 to detect whether a temperature of an IC exceeds a predetermined threshold, a configuration logic 102 to configure thermal sensor 101 based on a thermal configuration associated with the IC, a thermal counter 103 to provide a predetermined period of time to allow the thermal readings of thermal sensor 101 to be stable, an output control logic 104 having enabling and overriding capabilities, a clock generation logic 105 to generate stable clock signals, and a power detection logic 106 to detect when a power reaches a predetermined level.

In one embodiment, thermal sensor 101 is designed to check for conditions that would lead to destructive IC overheating and shut down the IC. In one embodiment, thermal sensor 101 includes an input to receive a trip point specified by configuration logic 102 and an output, also referred as a catastrophic trip output, coupled to IO control logic 104 to asserts a signal (e.g., a catastrophic signal) when a temperature of the IC exceeds the trip point. To ensure that thermal sensor 101 is accurate, according to one embodiment, a power supplied to thermal sensor 101 is stable and it has stabilization time after thermal sensor 101 receives the thermal configuration from configuration logic 102. Otherwise, thermal sensor 101 could generate erroneous thermal trip assertions. However, relying on external signals or events to enable the thermal sensor could lead to conditions where the IC overheats without the thermal sensor active.

Configuration logic 102 provides a trip point setting to thermal sensor 101. In one embodiment, configuration logic 102 includes a PROM (programmable read only memory) FSM (finite state machine) that waits for power supplied to the IC to reach a stable level within the IC's specifications. Configuration logic 102 may also waits for clock generation logic 105, which typically includes a phase lock loop (PLL), to lock a clock signal to ensure that there are stable clocks supplied to the IC. According to one embodiment, regardless of whether the PLL is locked, clock generation logic distributes the clocks to the IC. Once the power and clock signals are stable, a thermal trip point is provided to thermal sensor 101. In one embodiment, the thermal trip point is read from the PROM block and is sent to thermal sensor 101. According to one embodiment, the thermal trip point is read from the PROM in parallel into a shift register. The PROM shift register is connected serially to a shift register of thermal sensor 101. The PROM FSM then may shift the thermal configuration (e.g., the thermal trip point) from the PROM block to the thermal sensor.

According to one embodiment, thermal counter 103 determines how long to wait before the output of thermal sensor 101 is enabled. The time delay period is specifically configured according to different thermal sensor designs and silicon processes. In one embodiment, a worst case time period of each design is utilized. Thermal counter 103 may use an internal bus clock instead of the MainCPUClk to count to reduce variation of the time to count across internal bus ratios. According to one embodiment, the specification for the fastest possible bus clock determines the final counter value. In the event that the external bus clock is removed or fails, according to another embodiment, an internal ring oscillator may be used to provide clocking to generate an internal bus clock. According to one embodiment, thermal counter 103 does not start counting until power is good (e.g., power reaches a predetermined level) and the fuse configuration has been fully shifted to thermal sensor 101. When the final counter value has been reached, thermal counter 103 may assert a sensor stable signal to output control logic 104. The sensor stable signal is de-asserted and thermal counter 103 is reset when the power is not good (e.g., power is below a predetermined level) or alternatively, if thermal sensor configuration data is re-sent to thermal sensor 101 from the PROM block or if thermal sensor configuration is overridden via a debug mechanism.

Output control logic 104 combines the catastrophic trip output received from thermal sensor 101 with the sensor stable signal from thermal counter 103 and some override logic. In a default state, according to one embodiment, when the sensor stable signal received from thermal counter 103 is asserted the value of the catastrophic trip signal is placed on a shutdown signal. If the sensor stable signal is de-asserted, the shutdown signal is de-asserted. If the shutdown signal is asserted, the PLL is stopped and a signal is sent off-chip to instruct a VRM (voltage regulator module) to remove at least a portion of the power from the IC. In one embodiment, output control logic 104 includes debug mechanisms to force shutdown assertion, to disable shutdown assertion, and to switch to the chip reset mechanism of controlling the sensor stable signal.

As a result, the possibility of destructive chip overheating is reduced greatly. According to one embodiment, the embodiments discussed above can greatly reduce chip overheating even during a chip reset or in the absence of a stable clock. A conventional method uses the chip reset to disable the thermal sensor when the chip is in reset. That is, the output of the thermal sensor is disabled during a chip reset. Unfortunately, chip reset is a high power state and an extended amount of time in reset may cause overheating. If the thermal sensor is disabled during the reset, the overheating may rapidly become destructive, destroying the chip and possibly the motherboard and even becoming a fire hazard.

Specifically, according to one embodiment, power detection logic 106 includes a first input to receive a power signal 107 and compares it with a reference voltage 108 received from a second input. Reference voltage 108 may be provided via an internal forward-Biased Diode reference, operating independently from power signal 107. Power detection logic 106 may be just a simple comparator to compare power signal 107 against reference voltage 108. Power detection logic 106 asserts a PwrIsGood (e.g., power is good) signal 109 when the power signal 107 is greater than reference voltage 108. In one embodiment, reference voltage 108 is 0.8 volts. PwrIsGood signal 109 is fed to inputs of configuration logic 102 and clock generation logic 105.

Clock generation logic 105 is responsible to generate stable internal clock signals to drive other components within the IC, such as configuration logic 102, thermal sensor 101, and thermal counter 103. In one embodiment, clock generation logic 105 supplies a ring-oscillator clock until PwrIsGood signal 109 is received and PLL 201 is locked. Thereafter, clock generation logic 105 supplies a PLL-based clock. As a result, clock generation logic 105 is enabled to generate clock signals, such as MainCPUClk signal 114 and BusClk signal 115, under all conditions, even if the IC is still in a reset state (e.g., reset signal 110 is still asserted). The clock signals generated during the reset of the IC drive configuration logic 102 and thermal counter 103, in combination with output control logic 104, provide thermal protection to the IC even during a reset period of the IC. According to one embodiment, this circuit allows thermal sensor 101 to be enabled in approximately 3.99 microseconds after the IC is powered up. In contrast, a conventional method relies on reset to disable/enable the thermal sensor and due to the specification requirements of reset, the thermal sensor cannot be turned on until at least a millisecond after the IC is turned on. Such extended reset could damage the IC.

According to another embodiment, clock generation logic 105 may be disabled when the IC is shutdown via a shutdown signal 113 received from output control logic 104 via a feedback path 112. Once clock generation logic 105 is enabled, it generates a MainCPUClk 114 and a BusClk 115. In addition, clock generation logic 105 may include a lock mechanism to lock clock signals 114 and 115. When clock signals 114 and 115 are locked (e.g., clock signals are stable), according to one embodiment, clock generation logic 105 asserts a PLLLock signal 116, which is fed to an input of configuration logic 102, to indicate the clock signals 114 and 115 are stable. In one embodiment, clock generation logic 105 derives clock signals 114 and 115 from an external clock, such as BusClkIn 111, which may be a system clock. Alternatively, if the external clock 111 is not available or is not stable, clock generation logic 105 may generate clock signals 114 and 115 from an internal clock, such as a ring oscillator, within clock generation logic 105. In order to activate thermal sensor 101 when clocks are unstable or BusCLKIN 111 is not available, PLLLock signal 116 is activated upon the de-assertion of Reset signal 110 also. This allows for a measure of protection even under the extreme case where temperatures become too hot even in the absence of an external clock.

Configuration logic 102 is responsible to configure thermal sensor 101 (e.g., setting up a trip point to thermal sensor 101). In one embodiment, configuration logic 102 includes a PROM FSM to wait for PwrIsGood signal 109 which indicates the power supplied to the IC reaches a stable level within the IC specifications. Configuration logic 102 may also wait for PLLLock signal 116 received from clock generation logic 105, which indicates a clock signal, such as MainCPUClk signal 114, is stable. Once power and clock signals are stable, a thermal trip point is provided to thermal sensor 101. In one embodiment, the thermal trip point is read from the PROM block and is sent to thermal sensor 101. According to one embodiment, the thermal trip point is read from the PROM in parallel into a shift register. The PROM shift register is connected serially to a shift register of thermal sensor 101. The PROM FSM then shifts the thermal configuration from the PROM block to the thermal sensor, via ThermalCfg path 117. The shifting of the thermal trip point is driven by MainCPUClk signal 114. Once the configuration of thermal sensor 101 has been completed, according to one embodiment, configuration logic 102 asserts a ThermalCfgDone signal 118 to thermal counter 103 indicating the completion of the thermal configuration.

As soon as the thermal configuration is completed, according to one embodiment, thermal sensor 101 starts to measure and detect a temperature of an IC against a predetermined threshold, such as a trip point, based on a thermal configuration provided by configuration logic 102 (via ThermalCfg 117). Thermal configuration data, such as a trip point, is used to program a current source within the thermal sensor to provide a reference voltage. In one embodiment, the thermal configuration data is specifically designed for a specific IC. Thermal sensor 101 may use the reference voltage to determine whether a temperature of an IC exceeds a predetermined threshold. If so, thermal sensor 101 asserts a signal, such as CatastrophicTrip signal 119, to output control logic 104 indicating that the temperature of the IC exceeds a thermal trip point dedicated to the IC. In one embodiment, thermal sensor 101 asserts CatastrophicTrip signal 119 when the temperature of the IC is greater than 65° C. plus the value received from ThermalCfg 117 (e.g., the thermal trip point).

According to one embodiment, CatastrophicTrip signal 119 asserted by thermal sensor 101 may be held by output control logic 104 because, among other reasons, output control logic 104 may be disabled by thermal counter 103. In other words, output control logic 104 does not assert any signal (e.g., CatastrophicTrip signal 119) without receiving a SensorStable signal 120 indicating the readings of thermal sensor 101 are stable. If thermal sensor 101 is not stable, CatastrophicTrip signal 119 may not be valid which may causes an undesirable result.

SensorStable signal 120 is controlled by thermal counter 103. Thermal counter 103 is responsible to stall a predetermined period of time to allow the thermal readings of thermal sensor 101 to become stable. According to one embodiment, as soon as thermal counter 103 receives ThermalCfgDone signal 118, concurrent to the thermal configuration setting shift being finished, thermal counter 103 starts to count up to a predetermined clock cycles driven by BusClk 115. In one embodiment, when thermal counter 103 counts up to 798 clock cycles, it asserts SensorStable 120 to output control logic 104.

Once output control logic 104 receives SensorStable signal 120, it is enabled to output a signal, such as shutdown signal 113, to a voltage regulator module (VRM) based on CatastrophicTrip signal 119. The VRM may completely shutdown the IC or at least remove a portion of the power supplied to the IC. For example, when output control logic 104 is enabled (e.g., SensorStable signal 120 is asserted), shutdown signal 113 is asserted if CatastrophicTrip signal 119 is asserted. Otherwise, shutdown signal 113 is de-asserted. In addition, according to one embodiment, shutdown signal 113 is fed back to an input of clock generation logic 105 via path 112. When shutdown signal 113 is asserted, the shutdown signal 113, which is fed back to clock generation logic 105, disables clock generation logic 105. As a result, the IC would not receive any clock signal which is primarily a driven signal to the operations of the IC and the overheating of the IC is prevented. Note that, typically, a large portion of the heat generated by the IC comes from the PLL and clocks toggling. Stopping the clocks also stops most data propagation, thus also limiting heat generated from data signal switching. The rest of the heat comes from other effects such as leakage which is can only be stopped by removing power to the IC.

Figure 2:
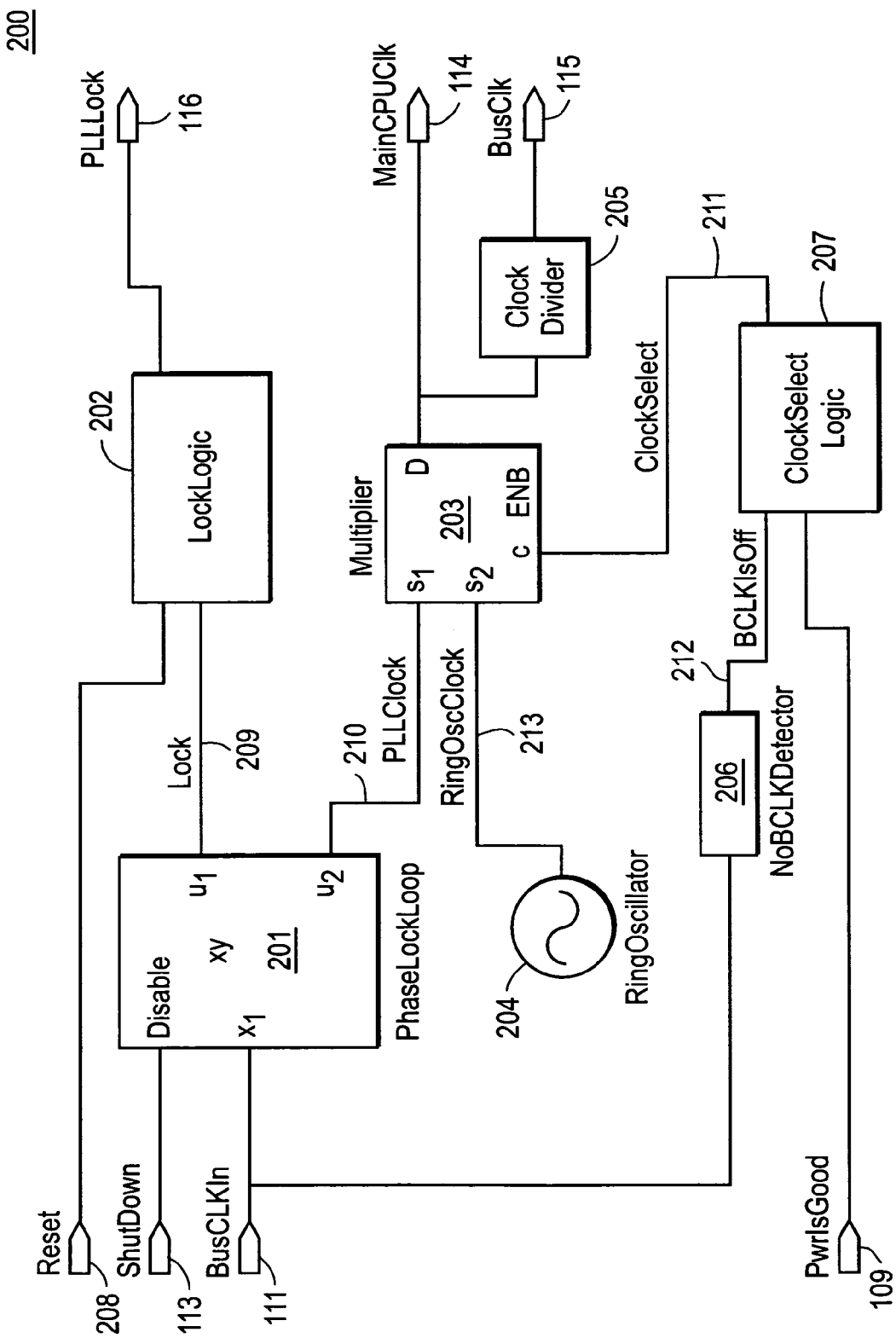
FIG. 2 is a block diagram of an exemplary embodiment of clock generation logic.

FIG. 2 shows a block diagram of an exemplary embodiment of a clock generation logic circuit which may be used as clock generation logic 105 of FIG. 1. Referring to FIG. 2, in one embodiment, exemplary circuit 200 includes a phase lock loop (PLL) circuit 201 to generate a stable clock signal based on an external clock, a lock logic 202 to indicate whether the clock signals are stable, and a clock selection logic 207 which drives a multiplexer 203 to select an external clock vs. an internal clock based on whether an external clock is off detected by clock detector 206.

PLL 201 is responsible for generating a stable clock signal with a constant phase angle based on an external clock. Specifically, according to one embodiment, PLL 201 generates a stable clock signal such as PLLClock 210 based on BusClkIn 111. However, PLL 201 may be disabled by a shutdown signal 113 asserted by output control logic 104 via path 112 when a temperature of an IC exceeds a predetermined threshold. As a result, when PLL 201 is disabled, no PLLClock signal 210 is generated. In addition, even when PLLClock signal 210 is generated, it may take a while to become stable. PLL 201 also has a capability to lock PLLClock signal 210 into a constant phase angle to achieve a stable clock signal. When PLLClock signal 210 is locked, according to one embodiment, PLL 201 asserts a lock signal 209 to LockLogic 202 indicating that PLLClock signal 210 is stable.

LockLogic 202 is responsible to generate a PLLLock signal 116 to be sent to configuration logic 102 of FIG. 1 indicating MainCPUClk 114 is stable, such that configuration logic 102 may start to configure thermal sensor 101. According to one embodiment, LockLogic 202 asserts PLLLock signal 116 if lock signal 209 received from PLL 201 is asserted (e.g., the PLLClock signal 210 has been locked by PLL 201) or reset signal 208 has been de-asserted (e.g., the IC has been out of a reset state), whichever occurs first. As a result, clock generation logic 200 is enabled to generate clock signals, such as MainCPUClk signal 114 and BusClk signal 115, as soon as the IC is powered up to a predetermined level (e.g., PwrIsGood signal 109 is received), even if the IC is still in a reset state (e.g., reset signal 208 is still asserted). The clock signals generated during the reset of the IC drive thermal sensor 101 and thermal counter 103, in combination with output control logic 104, provide thermal protection to the IC even during a reset period of the IC. According to one embodiment, this circuit allows thermal sensor 101 to be enabled within approximately 3.99 microseconds after the IC is powered up. In contrast, a conventional method relies on reset to disable/enable the thermal sensor and due to specification requirements of reset, it could not turn on the thermal sensor until at least a millisecond after the IC is turned on. Such extended reset could damage the IC.

According to one embodiment, MainCPUClk 114 is generated by PLL 201 based on an external clock received from BusClkIn 111. Alternatively, it may be generated by an internal clock, such as RingOscClock signal 213 from RingOscillator 204. This may be accomplished by multiplexer 203 to select either the external clock or the internal clock. Multiplexer 203 is controlled by a ClockSelect logic 207 which generates a ClockSelect signal 211 to instruct Multiplexer 203 to select appropriate clock source accordingly. In general, MainCPUClk 114 is generated from an external clock, such as BusClkIn 111 which may be the system clock. However, occasionally, the external clock may not be available or unstable. This situation may happen when the IC or the system having the IC is in a power saving mode, in which case the external clock is not available at BusClkIn 111. During which period, MainCPUClk 114 and BusClk 115 are not generated from the PLL. As a result, configuration logic 102, thermal sensor 101, and thermal counter 103 would not function and thermal protection would not be available for the IC during this period without ring oscillator supplied clocks.

Accordingly, in one embodiment, an internal clock (e.g., RingOscillator 204), which is selected by Multiplexer 203, is used to generate MainCPUClk 114 and BusClk 115. The availability of the external clock from BusClkIn 111 may be detected by a clock detector, such as NoBCLKDetector 206. According to one embodiment, when there is no clock signal or bad clock signal at BusClkIn 11, NoBCLKDetector 206 asserts a BCLKIsOff signal 212 to ClockSelect logic 207. ClockSelect logic 207 is responsible to instruct multiplexer 203 to select either an external clock or an internal clock. According to one embodiment, ClockSelect logic 207 generates ClockSelect signal 211 to instruct multiplexer 203 to select the internal clock (e.g., RingOscClock 213 generated from RingOscillator 204) if BCLKIsOff signal 212 is asserted or PwrIsGood signal 109 is de-asserted. Otherwise, ClockSelect signal 211 instructs multiplexer 203 to select the external clock received from BusClkIn 111. Clock divider 205 divides MainCPUClk 114 to generate BusClk 115 and thus, in general, MainCPUClk 114 is a multiple of BusClk 115.

Figure 3:
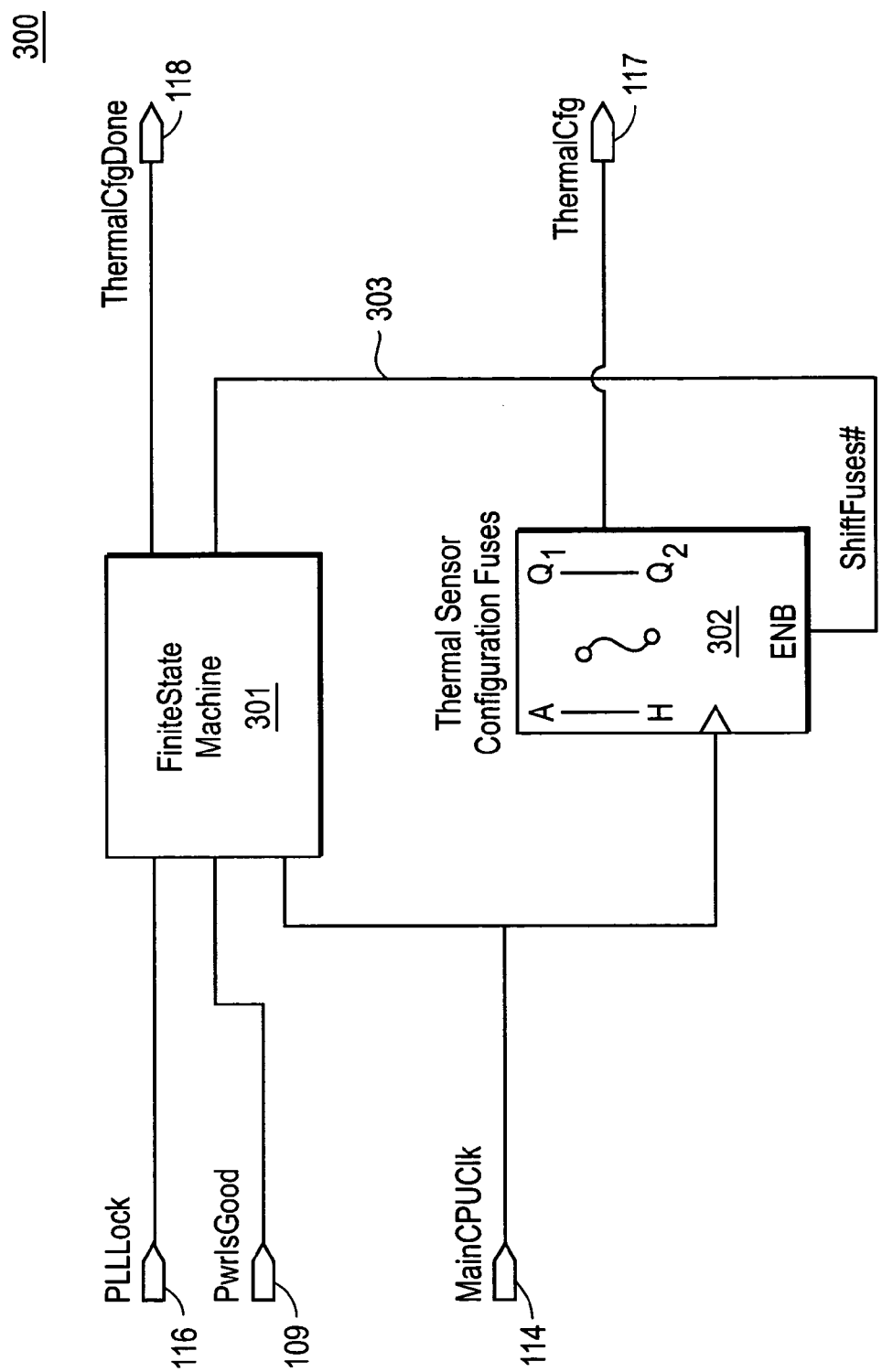
FIG. 3 is a block diagram of an exemplary embodiment of thermal configuration logic.

FIG. 3 shows a block diagram illustrating an exemplary embodiment of a thermal configuration logic which may be used as configuration logic 102 of FIG. 1. In one embodiment, among others, exemplary configuration logic 300 includes a finite state machine (FSM) 301 coupled to a thermal sensor configuration fuse logic 302 to configure a thermal sensor, such as thermal sensor 101 of FIG. 1. Typically, FSM 301 may include a model of computation consisting of a set of states, a start state, an input, and a transition function that maps the input and current state to a next state. Computation begins in the start state with an input. It changes to new states depending on the transition function. Configuration fuse logic 302 may include one or more fuse circuits (not shown) which permanently set a logic value of a bit or bits. According to one embodiment, configuration fuse logic 302 includes a shift register (not shown) coupled to the one or more fuse circuits. The shift register may be serially connected a shift register of a thermal sensor (e.g., thermal sensor 101) to shift the values presented by the one or more fuse circuits to the thermal sensor via the corresponding shift registers. In one embodiment, the values of the one or more fuse circuits represent the thermal configuration information, such as a thermal trip point, that a thermal sensor can use it as a reference when it detects whether a temperature of an IC exceeds a predetermined temperature threshold, which may be derived from the thermal trip point.

Specifically, according to one embodiment, FSM 301 includes inputs receiving PLLLock signal 116, PwrIsGood signal 109, and MainCPUClk signal 114. FSM 301 may stay in an initial state until it receives asserted PLLLock signal 116 indicating MainCPUClk 114 is stable and asserted PwrIsGood signal 109 indicting the power supplied reaches a predetermined level (e.g., 0.8 volts). Once the above conditions are met, FSM 301 retrieves a number indicating a number of fuses used by configuration fuse logic 302 from a memory such as a PROM. FSM 301 starts to count against that number and asserts ShiftFuses# signal 303 driven by MainCPUClk 114 clock cycles. ShiftFuses# signal 303 enables configuration fuse logic 302 to shift a value from one of the fuse circuits through a shift register serially connected to a shift register of thermal sensor 101 via path ThermalCfg 117. Once FSM 301 finishes counting against the number of fuses, it asserts ThermalCfgDone signal 118 to thermal sensor 101 and thermal counter 103, indicating the thermal configuration has been completed.

Figure 4:
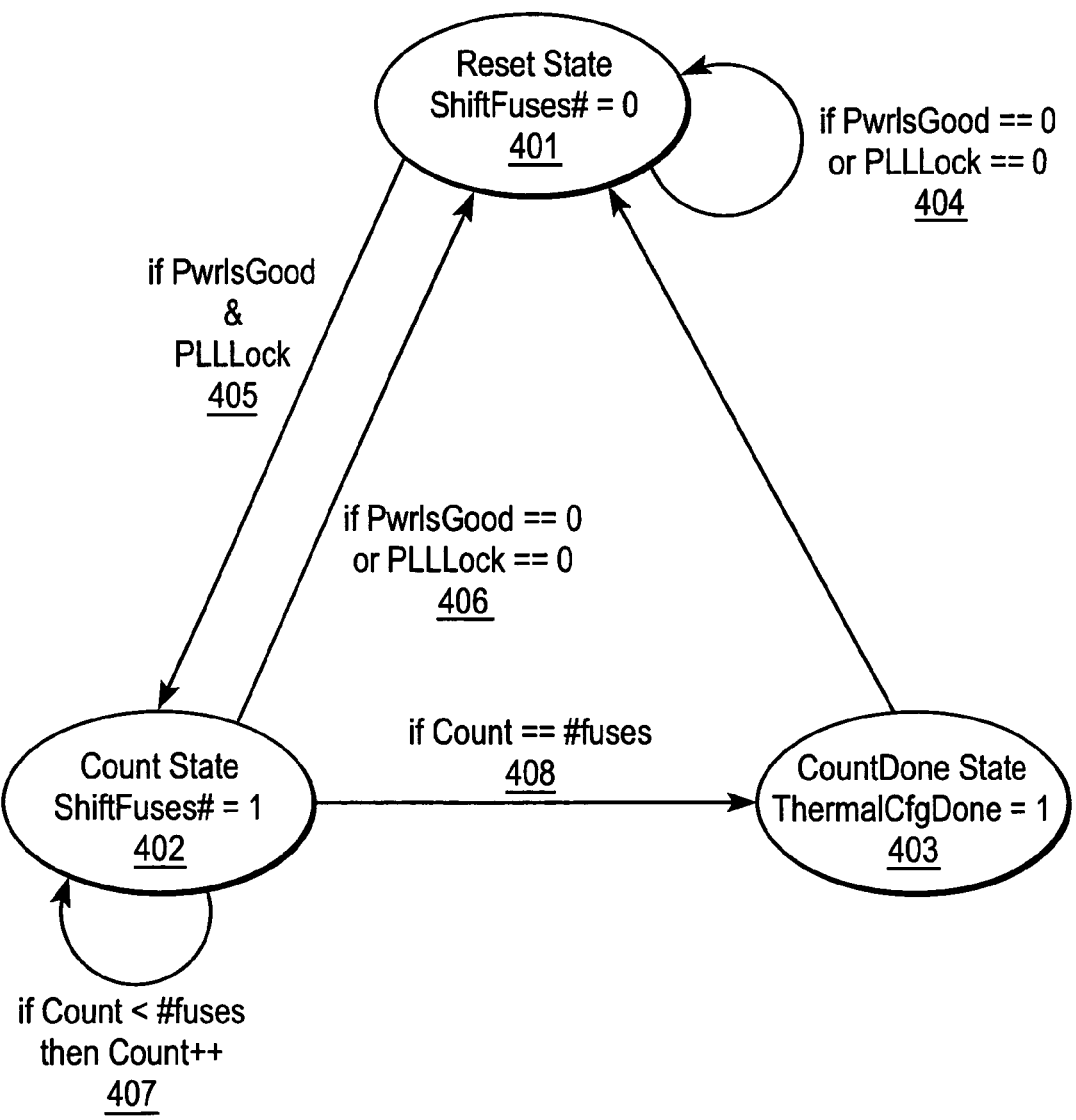
FIG. 4 is a block diagram of exemplary embodiment of operations of a finite state machine.

FIG. 4 shows a block diagram illustrating an exemplary embodiment of operations of a FSM which may be used as FSM 301 shown in FIG. 3. In one embodiment, exemplary FSM 400 includes a reset state 401, a count state 402, and a CountDone state 403. Referring to FIGS. 3 and 4, after FSM 400 retrieves number of fuses used by configuration fuse logic 302 from the PROM, FSM 400 enters a reset state 401. According to one embodiment, FSM 400 stays in reset state 401, via path 404, as long as PwrIsGood signal or PLLLock signal is de-asserted. After PwrIsGood signal and PLLLock signal are asserted, which indicates that power is good and the clock is locked, FSM 400 enters into count state 402 via path 405 and starts to count against the number of fuses involved. The counting is driven by MainCPUClk 114 and on every cycle of MainCPUClk 114, FSM 400 asserts ShiftFuses# signal to enable configuration fuse logic 302 to shift a corresponding value of a respective fuse to thermal sensor 101. Meanwhile, if any of PwrIsGood signal 109 and PLLLock signal 116 is de-asserted, FSM 400 returns to reset state 401 via path 406 from count state 402 and the counting may be reset back to zero. The above processes continue via path 407 until the counting number reaches the number of fuses involved. Upon which, via path 408, FSM 400 enters CountDone state 403 from count state 402. In CountDone state 403, FSM 400 asserts ThermalCfgDone signal 118 to indicate the thermal configuration has been completed and de-asserts ShiftFuses# to stop the shifting operation. Thereafter, FSM 400 returns back to reset state 401.

Figure 5:
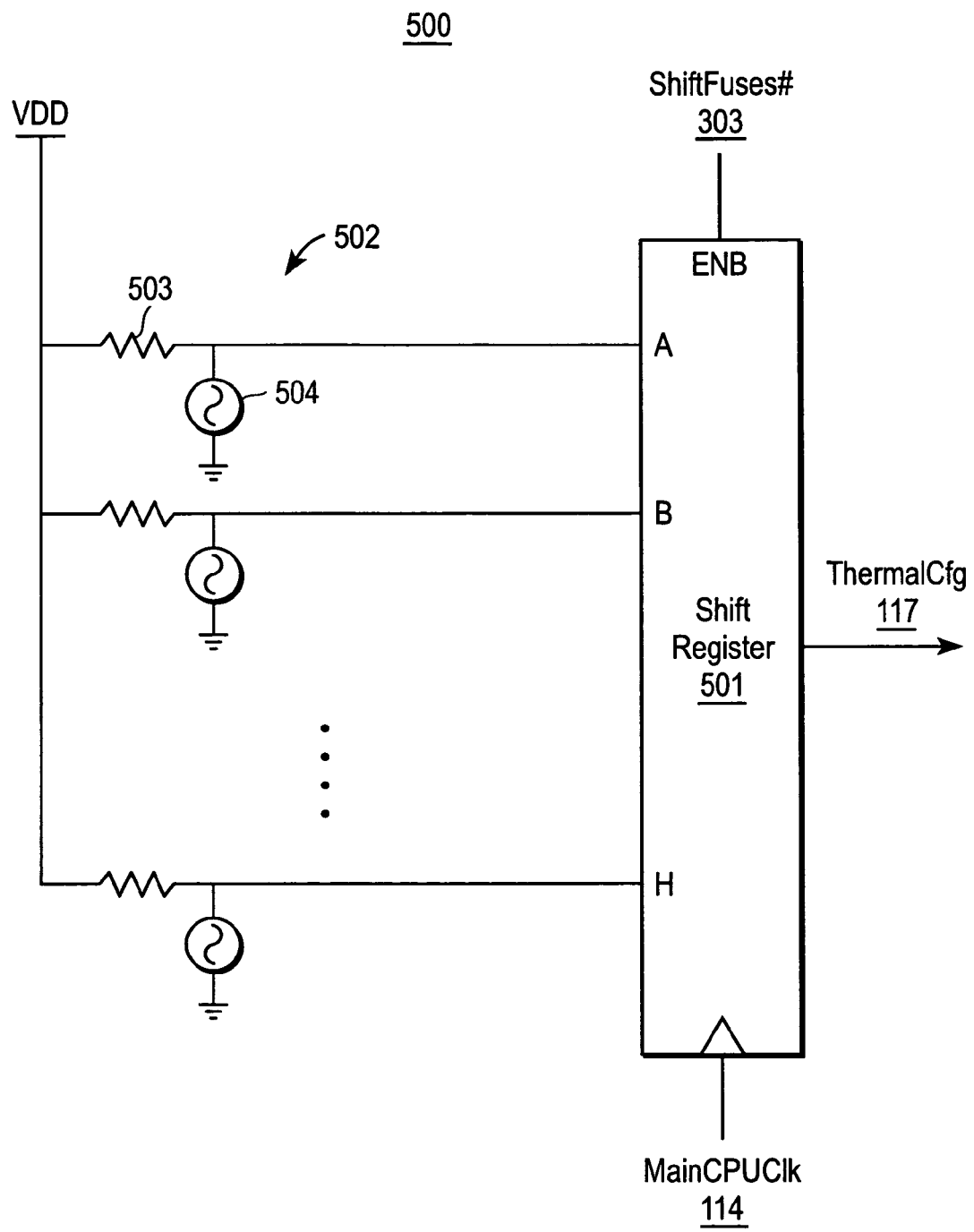
FIG. 5 is a block diagram of exemplary embodiment of fuse circuits and a shift register.

FIG. 5 shows a block diagram illustrating an exemplary embodiment of configuration fuse logic which may be used as fuse logic 302 of FIG. 3. In one embodiment, exemplary fuse logic 500 includes a shift register 501 with one or more fuse circuit 502 coupled in parallel to the respective inputs of shift register 501. Each of the fuse circuits includes a resistor 503 and a fuse 504. In one embodiment, fuse circuit 502 is used to permanently set bits of the corresponding inputs of register 501. Each fuse circuit 502 is constructed to set the logic level of different inputs of register 501. According to one embodiment, fuse 504 is blown to permanently set the associated input of register 501 to a logic one value. If fuse 504 is left intact, the associated input of register 501 has a logic zero value. Fuse 504 is coupled to the Vdd supply voltage level through a pull-up resistor 503. The junction of resistor 503 and fuse 504 furnishes a signal to one input of register 501. The output of register 501 is coupled to thermal sensor 101 via ThermalCfg signal 117. Shift register 501 may be a parallel-to-serial shift register which is serially connected to a shift register of thermal sensor 101. The embodiment shown in FIG. 5 is construed for demonstration purposes only. It may include other components apparent to those ordinary skills in the art. Other configurations may exist. For example, the fuse used may be a double-ended fuse which when unprogrammed, the fuse have an undeterminate value, either the zero leg or the one leg is blown to program the fuse to a specific value. However, it would be appreciated that embodiments of the invention are applicable to any kind of PROM designs.

Figure 6:
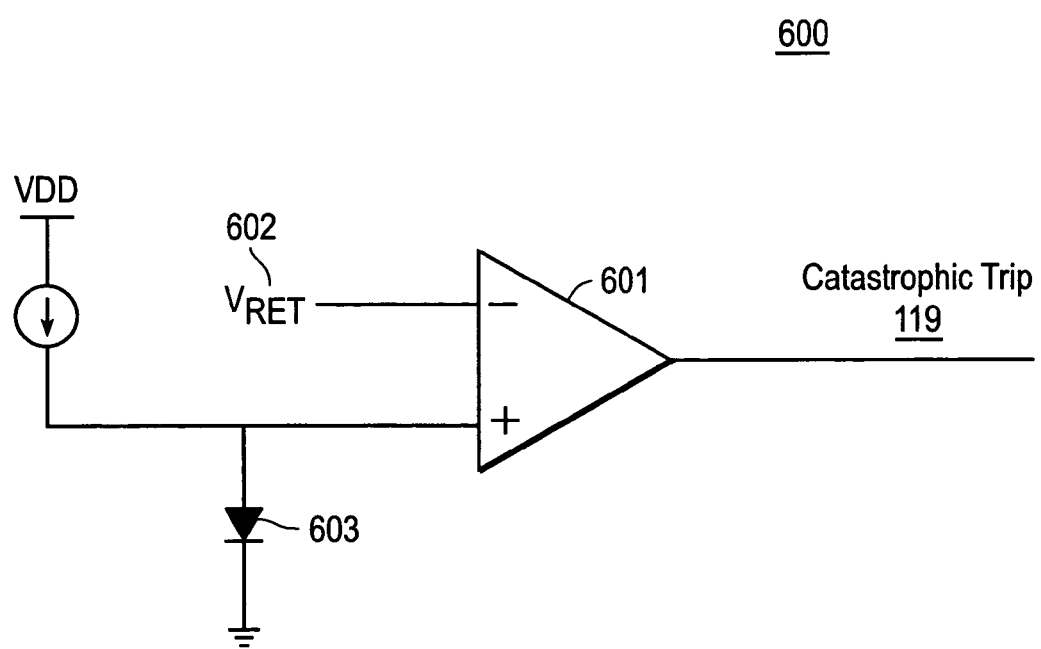
FIG. 6 is a block diagram of an exemplary embodiment of a thermal sensor.

FIG. 6 shows a block diagram illustrating an embodiment of an exemplary thermal sensor which may be used as thermal sensor 101 of FIG. 1. In one embodiment, the exemplary thermal sensor 600 includes a comparator 601, a reference voltage 602, and a thermal diode 603. Reference voltage 602 is coupled to an input of comparator 601. Reference voltage 602 is provided through a current source (not shown) based on a thermal trip point received from ThermalCfg signal 117 shown in FIG. 1. Thermal sensor 600 is constructed to monitor a temperature of a substrate. Comparator 601 indicates, via CatastrophicTrip signal 119, when the temperature of the substrate exceeds a predetermined threshold. The assertion of CatastrophicTrip signal 119 alerts circuitry of the IC such that a corrective action can be taken (e.g., adjusting clock frequency or remove at least a portion of power from the IC).

To generate the CatastrophicTrip signal 119, comparator 601 receives signal 602 that electrically represents the threshold and signal 603 that electrically indicates the temperature of the IC. Comparator 601 compares the voltage levels of those two signals, and based on the comparison, comparator 601 either asserts, or drives high, CatastrophicTrip signal 119 (to indicate an overheating condition) or de-asserts, or drives low, CatastrophicTrip signal 119 (to indicate the temperature is normal). Signal 603 represents the forward voltage across a PN junction (represented by a diode) of the substrate. As typical, the forward potential across a PN junction varies linearly and inversely with respect to temperature. As a result, as the temperature of the substrate rises, the voltage level 603 drops.

Figure 7:
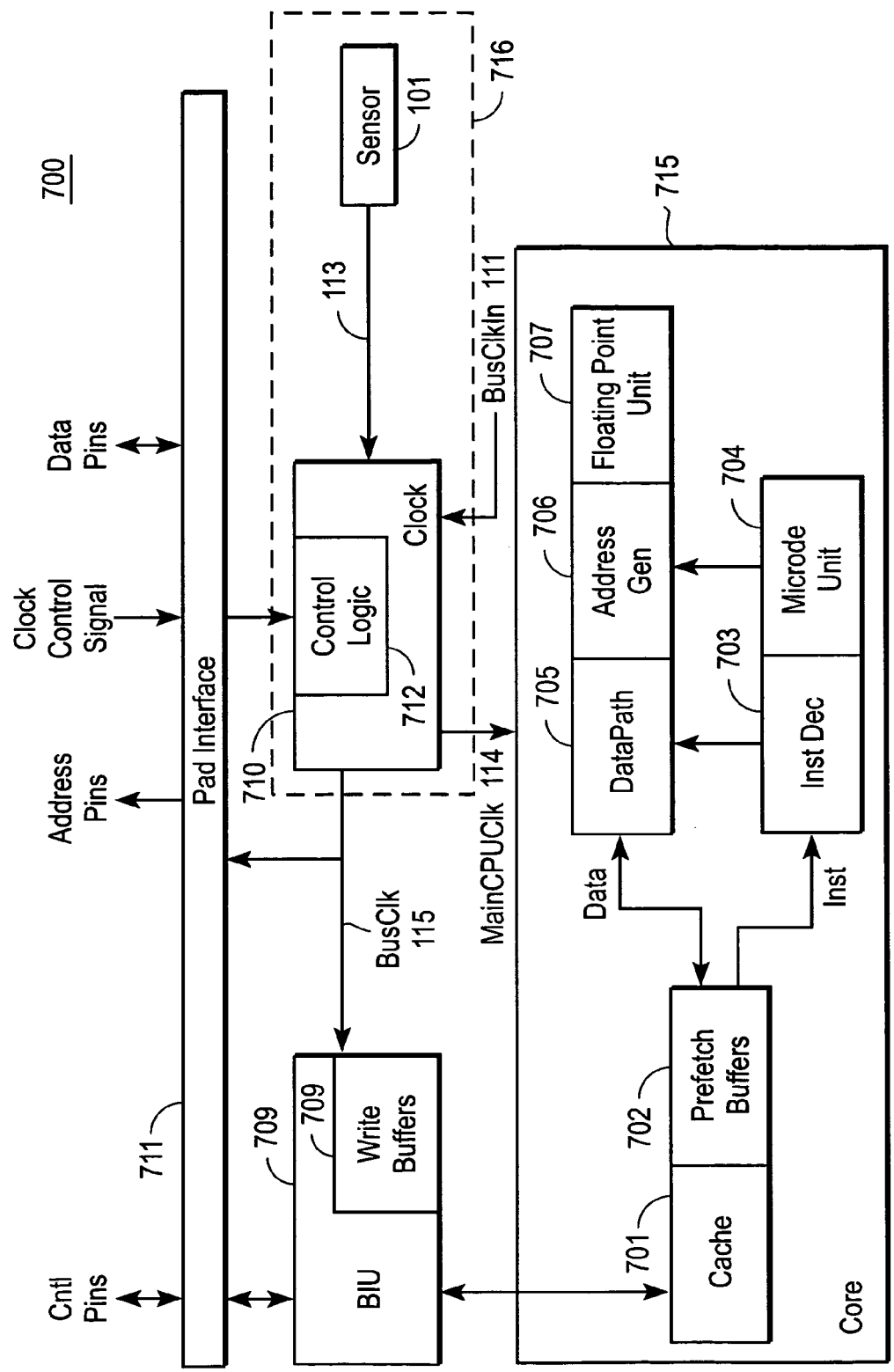
FIG. 7 is a block diagram of an exemplary embodiment of a processor.

FIG. 7 shows a block diagram illustrating an exemplary processor where an embodiment of thermal protection mechanism 100 shown in FIG. 1 may be used as thermal protection circuit 716 to prevent a processor from overheating. In one embodiment, microprocessor 700 includes a processing core 715 that processes data of a computer system. Processing core 715 includes a cache 701, prefetch buffers 702, an instruction decoder 703, a microcode unit 704, datapath circuitry 705, an address generator 706 and a floating point unit 707. Cache 701 stores instructions and data for execution by microprocessor 700. Prefetch buffers 702 retrieve data and instructions for execution by microprocessor 700. Buffers 702 retrieve the data and instructions either from cache 701 or if a cache miss occurs, from a memory of the computer system via a bus interface unit 708.

Instruction decoder 703 retrieves and decodes the instructions from prefetch buffers 702. Microcode unit 704 has a memory that stores microcode instructions for microprocessor 700. Microcode unit 704 interacts with the instruction decoder 703 to execute the instructions. To carry out execution of the instructions, microcode unit 704 provides address generator 706 with address information that address generator 706 uses to generate addresses necessary to carry out the execution of the instructions. In a similar manner, address generator 706 generates addresses for datapath circuitry 705 and floating point unit 707.

Microcode unit 704 is also responsible for instruction boundary processing, such as interrupt/exception arbitration, and the halting of the instruction decoder 703 when necessary. Microcode unit 704 also handles cache 701 misses. Datapath circuitry 705 provides the main execution data path for the microprocessor 700. Datapath circuitry 705 includes an arithmetic logic unit (ALU), control registers, a barrel shifter, read only memory (ROM) and flags. Datapath circuitry 705 retrieves data from prefetch buffers 702. Datapath circuitry 705 executes microcode provided by the instruction decoder 703 using data received from the prefetch buffers 702 according to the addresses generated by address generator 706. Floating point unit 707 is used in the execution of floating point instructions.

Outside of the processing core 715, microprocessor 700 has the bus interface unit (BIU) 708, a pad interface 711, and a clock generator 710 which may be a part of clock generation logic 105 shown in FIG. 1. Bus interface unit 708 provides an interface between internal buses of microprocessor 700 and external buses that are used to fetch data and instructions from a memory of the computer system. Bus interface 708 has write buffers 709 that are used to store data to be transferred from the microprocessor 700 to the rest of the computer system. Pad interface 711 provides a pin interface for control, address and data signals passed between the microprocessor 700 and the rest of the computer system.

Clock generator 710 receives a system clock signal (e.g., BusClkIn 111 shown in FIG. 1) and uses BusClkIn 111 to generate clock signals for microprocessor 700. The clock generator 710 furnishes a clock signal (e.g., BusClk 115) to bus interface unit 708 and pad interface 711. When the microprocessor 700 is overheating (as indicated by the assertion of shutdown signal 113 which is provided as a part of an output from thermal protection circuit 716), BusClk 115 and MainCPUClk 114 may be disabled, and power supplied to processor 700 may be removed.

Clock generator 710 furnishes another clock signal (e.g., MainCPUClk 114) to the processing core 715. MainCPUClk 114 is synchronized to BusClkIn 111 and has a frequency that is a multiple (e.g., a multiple of two) of the frequency of BusClkIn 111. As a result, when microprocessor 700 is operating under normal conditions, processing core 715 generally operates at a higher frequency than the rest of the computer system.

Control logic 712 of clock generator 710 receives shutdown signal 113. When shutdown signal 113 is asserted, control logic 712 completely shuts off clock generator 710, unless an internal clock source, such as ring oscillator 204 is activated. As a result, the overheat resulting from the clock signals is prevented.

Figure 8:
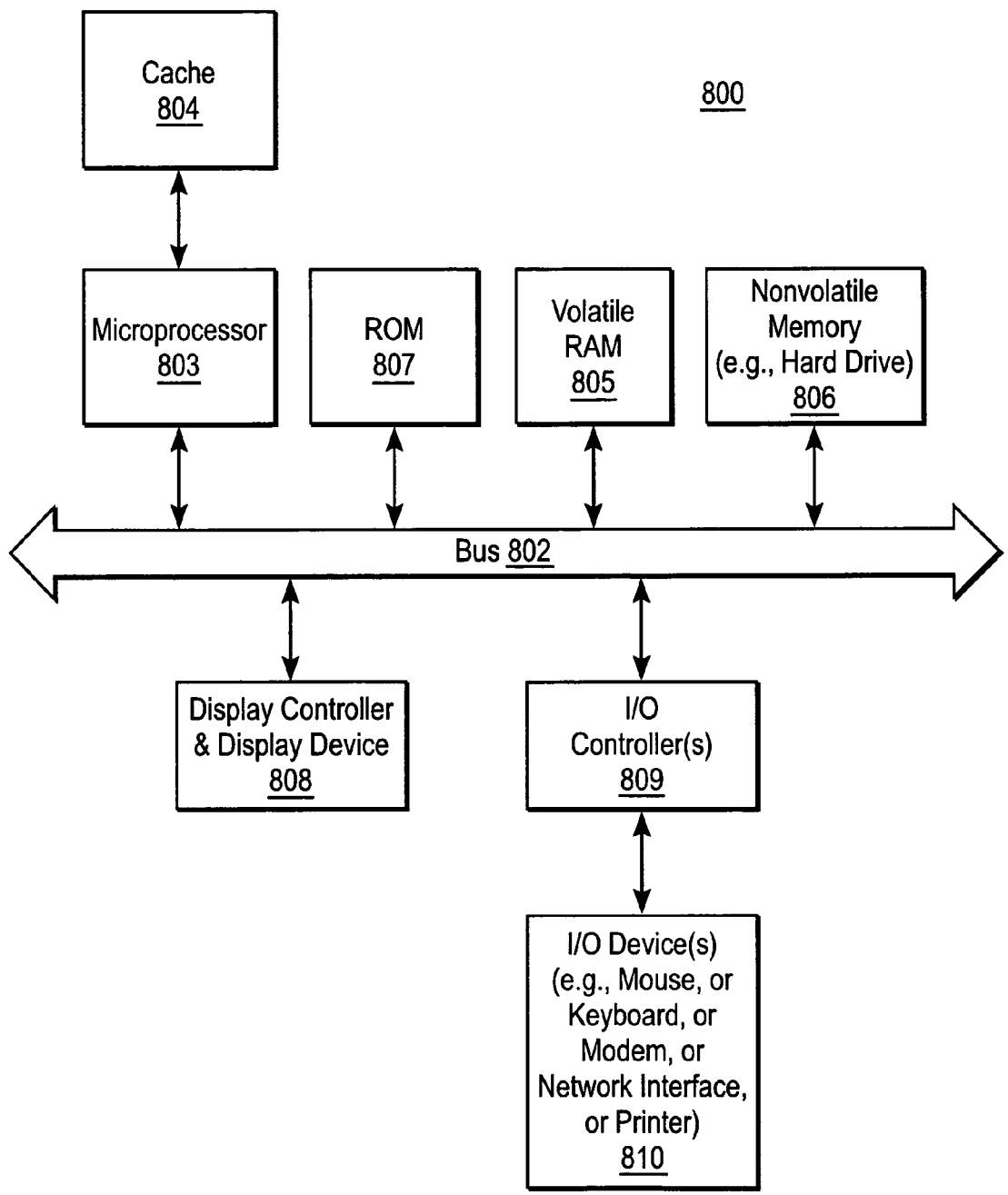
FIG. 8 is a block diagram of an exemplary embodiment of a computer.

FIG. 8 shows a block diagram of an exemplary computer which may be used with an embodiment of the invention. For example, system 800 shown in FIG. 8 may include a processor, such as processor 700 having a thermal protection mechanism 100. Note that while FIG. 8 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention.

As shown in FIG. 8, the computer system 800, which is a form of a data processing system, includes a bus 802 which is coupled to a microprocessor 803 and a ROM 807, a volatile RAM 805, and a non-volatile memory 806. The microprocessor 803, which may be a Pentium processor from Intel Corporation, is coupled to cache memory 804 as shown in the example of FIG. 8. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art. Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 8 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals.

Figure 9:
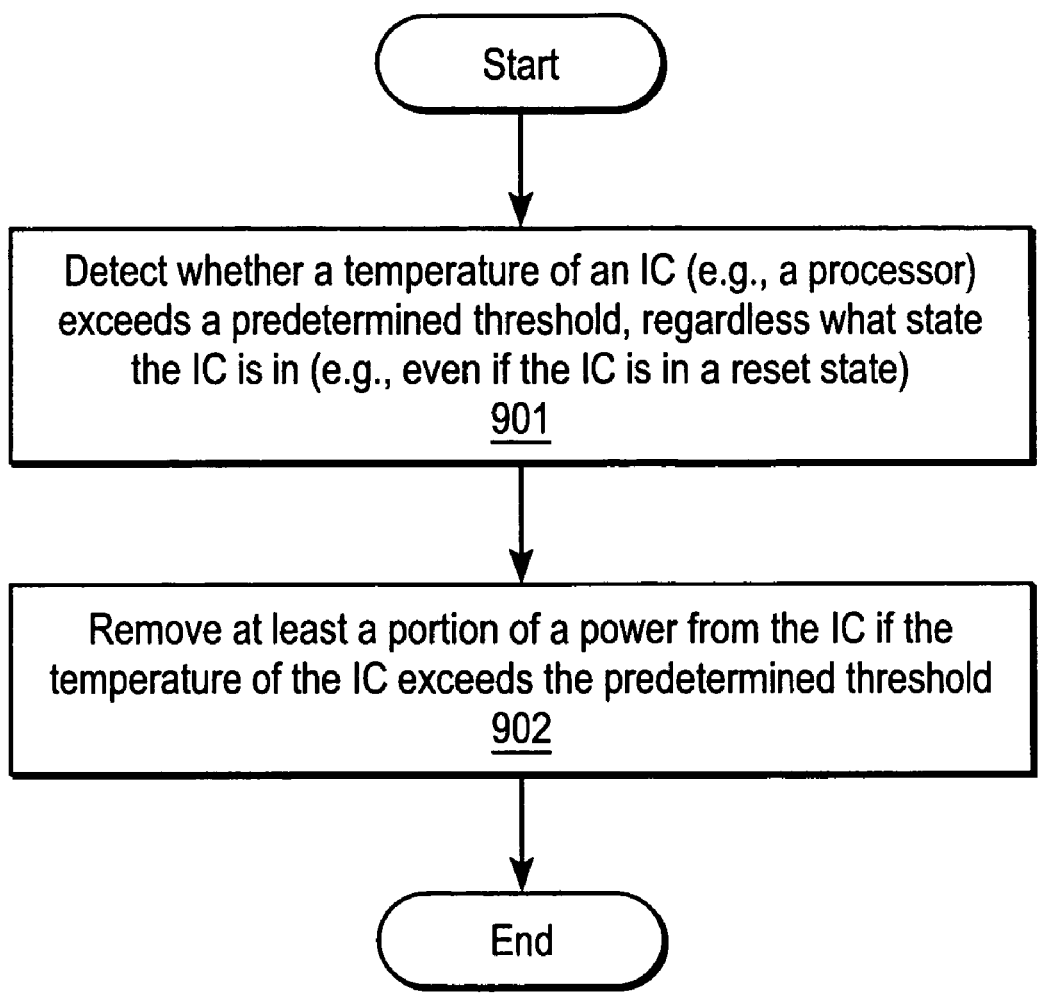
FIG. 9 is a flow diagram illustrating an exemplary embodiment of a thermal process.

FIG. 9 shows a flow diagram illustrating an embodiment of an exemplary thermal protection process. In one embodiment, exemplary process 900 starts at block 901 to detect whether a temperature of an IC exceeds a predetermined threshold, regardless what state the IC is in. For example, the detection is performed even if the IC is in a reset state. If the temperature of the IC exceeds a predetermined threshold (e.g., a CatastrophicTrip signal is asserted), at block 902, at least a portion of a power supplied to the IC is removed.

Figure 10:
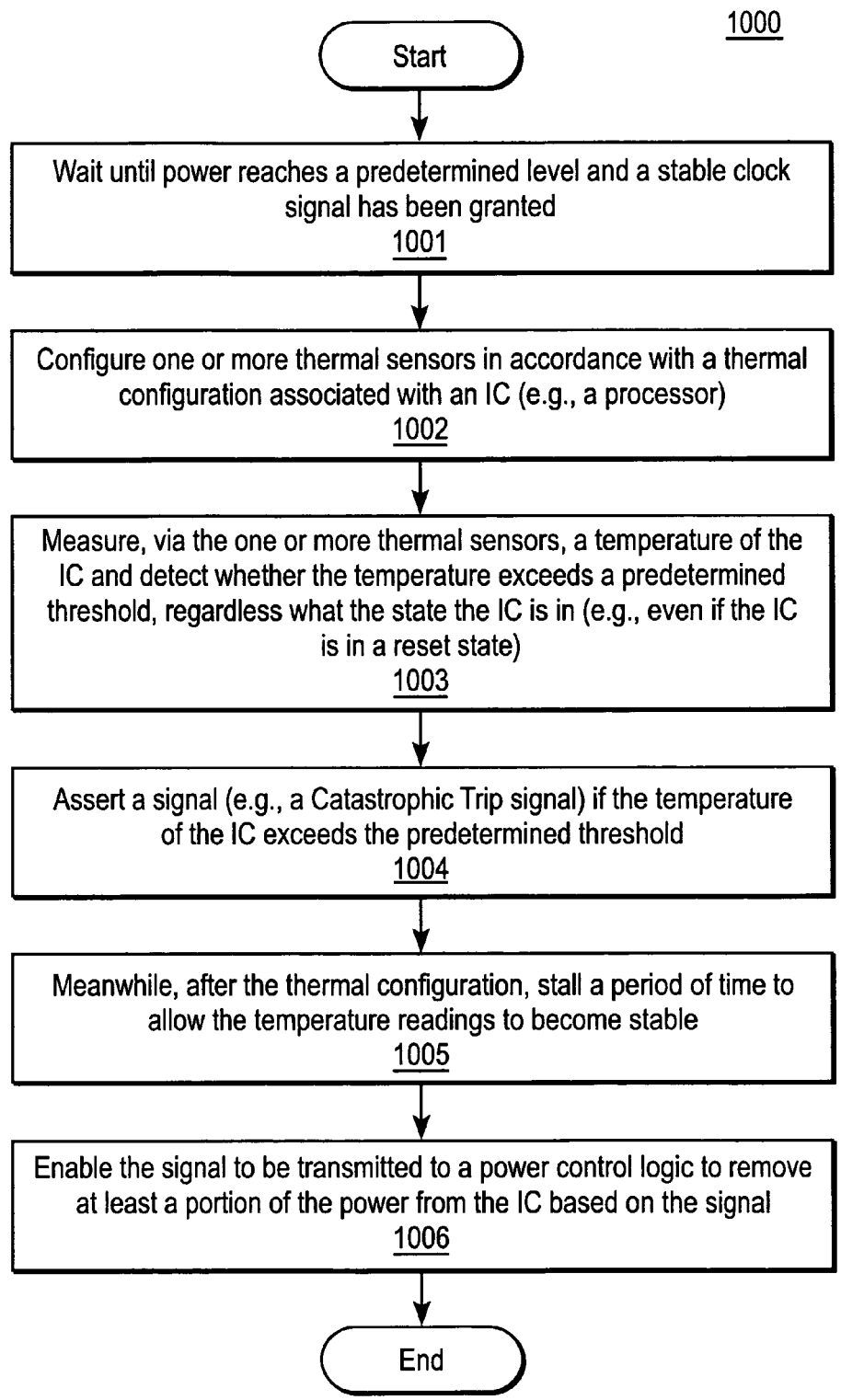
FIG. 10 is a flow diagram illustrating another exemplary embodiment of a thermal process.

FIG. 10 shows a flow diagram illustrating another embodiment of an exemplary thermal protection process. According to one embodiment, exemplary process 1000 starts at block 1001 where the system waits for a period of time until a power reaches a predetermined level and a stable clock signal has been generated. In one embodiment, this operation is performed by a power detection logic 106 and clock generation logic 105. At block 1002, one or more thermal sensors are configured in accordance with a thermal configuration associated with an IC, such as a microprocessor. At block 1003, one or more sensors measure a temperature of the IC and detect whether the temperature exceeds a predetermined threshold, regardless what state the IC is in. In one embodiment, the thermal detection is performed even if the IC is in a reset state. At block 1004, the thermal sensor may assert a signal, such as a CatastrophicTrip signal, if the temperature of the IC exceeds a predetermined threshold. Meanwhile, at block 1005, after the thermal configuration, a thermal counter stalls a period of time to allow the temperature readings become stable. Once the temperature readings become stable, at block 1006, the thermal counter enables an output control logic to output a signal (e.g., a shutdown signal) to a power control logic (e.g., a VRM) to remove at least a portion of a power from the IC.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus, comprising:
   a thermal sensor to detect whether a temperature of an integrated circuit (IC) exceeds a predetermined threshold independent of an operating state of the IC;
   an input or output (IO) control logic coupled to the thermal sensor to transmit a signal to remove at least a portion of a power from the IC if the temperature of the IC exceeds the predetermined threshold;
   a delay logic coupled to the IO control logic to stall for a predetermined period of time to allow a result of detection to be substantially stable prior to enabling the IO control logic to transmit the signal; and
   a configuration logic coupled to the thermal sensor and coupled to the delay logic to configure the thermal sensor based on a thermal configuration associated with the IC,
   wherein the configuration logic is to notify the delay logic when the configuration of the thermal sensor is completed.

2. The apparatus of claim 1, wherein the thermal sensor is to detect whether the temperature of the IC exceeds the threshold while the IC is in a reset state.

3. The apparatus of claim 1, wherein the thermal sensor is to perform the detection when the IC is powered up to a predetermined level or when the IC comes out of a reset state.

4. The apparatus of claim 1, wherein the delay logic comprises a counter to determine how long the delay logic has to wait before enabling the IO control logic to transmit the signal.

5. The apparatus of claim 1, wherein the configuration logic is to read the thermal configuration information from a memory and to shift the thermal configuration information to the thermal sensor.

6. The apparatus of claim 1, wherein the thermal sensor is to start to detect the temperature of the IC after the configuration of the thermal sensor is completed.

7. The apparatus of claim 1, further comprising a power detection logic coupled to the configuration logic to detect that the IC is powered with a predetermined power level before enabling the configuration logic to configure the thermal sensor.

8. The apparatus of claim 1, further comprising a clock signal generator coupled to the configuration logic, the delay logic, and the thermal sensor, the clock signal generator to provide clock signals to drive the configuration logic, the delay logic, and the thermal sensor.

9. The apparatus of claim 8, wherein the clock signal generator comprises:
   an internal clock; and
   a clock selection logic coupled to select the internal clock to generate the clock signals when an external clock is unavailable or a power supplied to the IC has not reached a predetermined level.

10. The apparatus of claim 1, further comprising:
    a clock signal generator coupled to the configuration logic, the delay logic, and the thermal sensor, the clock signal generator to provide clock signals to drive the configuration logic, the delay logic, and the thermal sensor,
    wherein the clock signal generator comprises a clock logic to signal the configuration logic that the clock signals are substantially stable before the configuration logic is enabled to configure the thermal sensor.

11. An apparatus, comprising:
    one or more thermal sensors coupled to detect whether a temperature of an integrated circuit (IC) exceeds a predetermined threshold when the IC is powered up to a predetermined level or when the IC comes out of a reset state;
    an input/output (IO) control logic coupled to the one or more thermal sensors to generate a first signal to remove at least a portion of a power from the IC if the temperature of the IC exceeds the predetermined threshold;

a delay logic coupled to the one or more thermal sensors and coupled to the IO control logic to stall a period of time prior to enable the IO control logic to generate the first signal; and a configuration logic coupled to configure the one or more thermal sensors, to the delay logic to assert a second signal to the delay logic to indicate a completion of the configuration, and to the second signal to enable the delay logic to stall for the period of time.

12. The apparatus of claim 11, further comprising a clock generator coupled to generate one or more clock signals to drive operations of the configuration logic, the delay logic, and the one or more thermal sensors, the clock generator to assert a third signal when the one or more clock signals are substantially stable.

13. The apparatus of claim 12, further comprising a power detection logic coupled to detect whether a power supplied to the IC reaches a level prior to enabling the configuration logic and the clock generator.

\* \* \* \* \*